Figure 5:
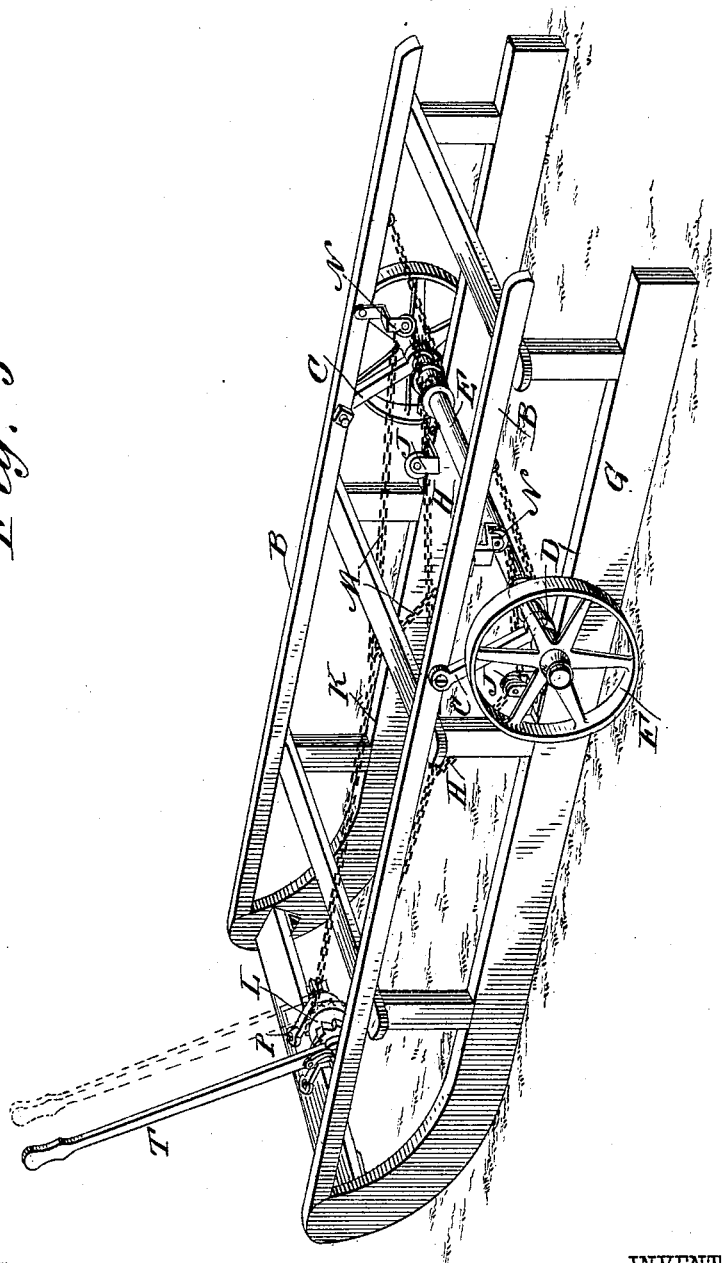

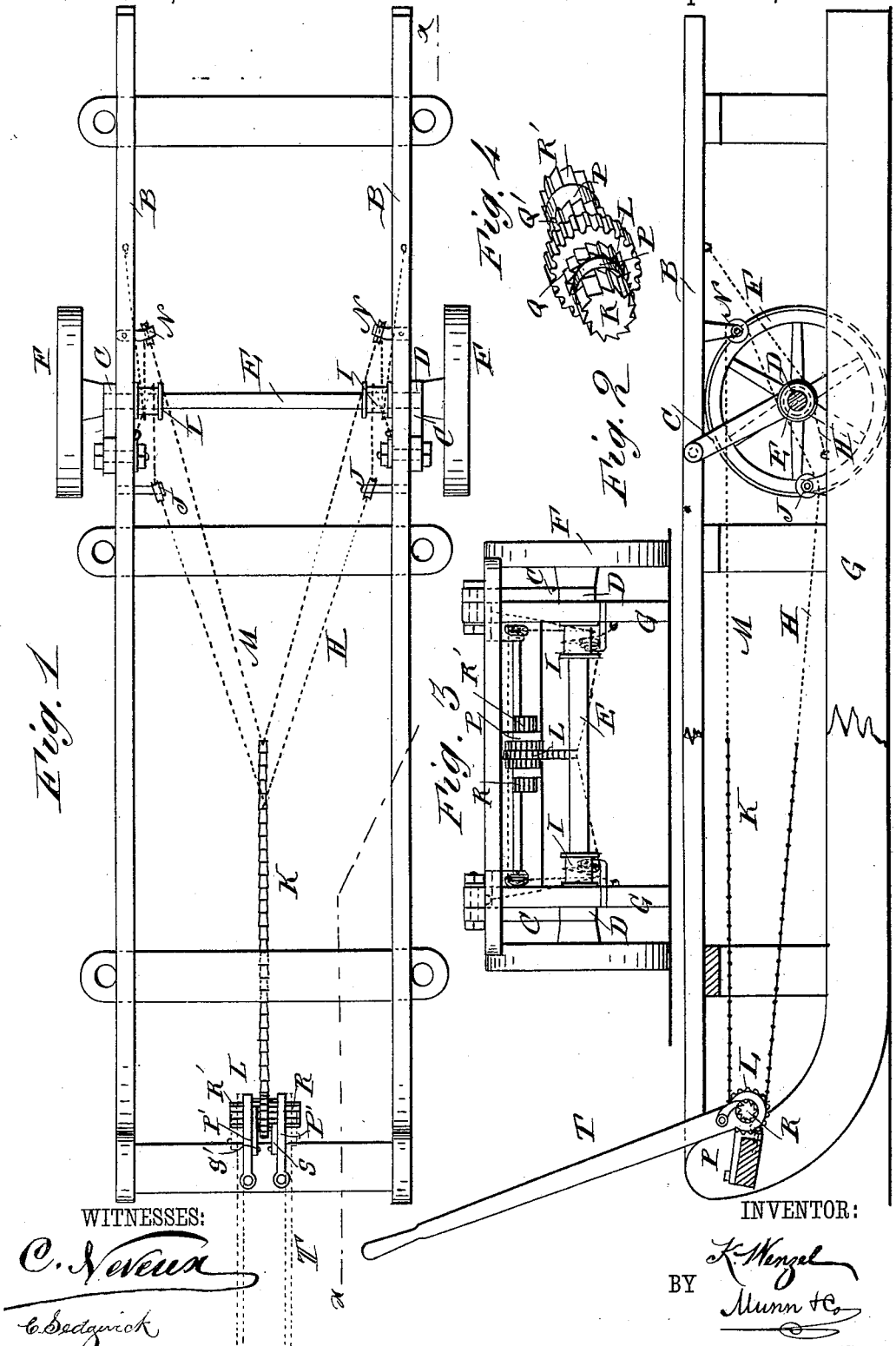

(No Model.) 2 Sheets—Sheet 2.

K. WENZEL.
SLED.

No. 390,048. Patented Sept. 25, 1888.

WITNESSES:
C. Neveux
C. Sedgwick

INVENTOR:
K. Wenzel
BY Munn & Co
ATTORNEYS.

UNITED STATES PATENT OFFICE.

KARL WENZEL, OF NEW YORK, N. Y.

SLED.

SPECIFICATION forming part of Letters Patent No. 390,048, dated September 25, 1888.

Application filed February 23, 1888. Serial No. 264,878. (No model.)

*To all whom it may concern:*

Be it known that I, KARL WENZEL, of the city, county, and State of New York, have invented a new and useful Improvement in Sleds, of which the following is a full, clear, and exact description.

This invention relates to an improvement in sleds particularly adapted for transporting logs in districts where bare patches of ground are frequent in the otherwise snow-covered roads.

The object of my improvement is to provide the sled with adjustable wheels and adjusting devices for the same, so constructed and arranged that the wheels can be easily and quickly lowered below the runners and securely locked in such adjustment to facilitate the passage over bare ground, and as readily raised to permit the sled to ride on its runners when snow is again reached.

The invention consists of certain novel combinations of parts and features of construction, hereinafter fully described, and distinctly pointed out in the claims.

Reference is to be had to the accompanying drawings, forming a part of this specification, in which similar letters of reference indicate corresponding parts in all the figures.

Figure 1 is a plan view of a sled provided with my improvement. Fig. 2 is a longitudinal sectional elevation of the same on the line *x x*, Fig. 1. Fig. 3 is a front end elevation of the same. Fig. 4 is a perspective view of a part hereinafter described, and Fig. 5 is a perspective view of the improved sled.

To the outer sides of the opposite side rails B of the sled frame, nearer the rear than the front end thereof, are pivoted the upper ends of corresponding arms, C, formed at their lower ends with like bearings, D, in which is mounted to revolve a transverse axle, E, carrying on either end, outside the sled-frame, wheels F, the arrangement being such that when the arms C are swung down into a vertical or nearly vertical position the rims of the wheels F will be below the sled-runners G, so that, the front end of the sled being raised from the ground by the draft-strain, the whole sled will travel on the wheels.

For adjusting the wheel-carrying arms C, ropes or chains H are attached at their one ends to the runners G about in a vertical line with the top pivots of the corresponding arms, C, are carried rearwardly around double pulleys I, mounted on the axle E just inside the bearings D, then around pulleys T, which are attached to the runners G in front of the end fastenings of the ropes or chains thereto, and their forward ends both attached to one end of a strong chain, K. The chain K is carried forward around a corresponding sprocket-wheel, L, mounted on the front end of the sled, then rearward again, and its free end connected to the ends of two other ropes or chains, M, which run rearwardly over pulleys N, attached to the opposite top rails, B, behind the respective axle-carrying arms C, thence forwardly around the double-pulleys I on the corresponding ends of the axle, and rearwardly again to the top rails B, to which they are securely attached at points behind the pulleys N, fixed thereto.

The sprocket-wheel *h* is mounted to turn centrally the front end of the sled in bearings P' on integral journals P, between which and the wheel *h*, on opposite sides thereof, are reverse ratchet-wheels Q Q', and on the ends other reverse ratchet-wheels, R R'.

Pawls S S', pivoted to the sled-frame, are arranged to engage the ratchet-wheels Q Q', respectively, so as to lock the sprocket-wheel L against turning in either direction, and the reverse end ratchet-wheels, R R', are both adapted for engagement with a single removable ratchet-lever, T, having a handle, by which the operator, while on the sled, may thus readily turn the sprocket-wheel L in either direction at will.

When the sprocket-wheel L is turned clockwise, the pawl S' being disengaged, it, through the main chain K, loosens the upper ropes or chains, M, and draws upon the lower ropes or chains, H, whereby the axle-bearing arms C are swung forward and the wheels adjusted below the runners, in which position they may be locked by again engaging the locking-pawl S'.

When the sprocket-wheel L is turned contra-clockwise, the locking-pawl S having been disengaged, the reverse is the case, the ropes or chains M being drawn upon so as to swing the axle-wheels rearward and upward to allow the runners to rest on the ground.

Having thus described my invention, what I claim as new, and desire to secure by Letters Patent, is—

1. The combination, with the frame of a sled, of pivotal bearing-arms on the same, carrying an axle and wheels and adapted to throw the rims of the wheels below the runners, ropes or chains arranged to swing the bearing-arms in one direction when drawn upon, other ropes or chains arranged to swing the bearing-arms in the opposite direction when drawn upon, a main chain having its ends connected, respectively, to said reverse operating ropes or chains, a sprocket-wheel around which the main chain passes, and means for rotating and locking the sprocket-wheel, substantially as described.

2. The combination, with the frame of a sled, adjustable wheel-bearings and wheels thereon, reverse adjusting devices for throwing and holding the wheels below or above the sled-runners at will, and a sprocket-wheel arranged to operate the reverse adjusting devices by and according to its rotation, of two pairs of reverse ratchets attached to the sprocket-wheel, a pair of locking-pawls adapted to engage one pair of reverse-ratchets, and a removable handled ratchet-lever adapted to engage and rotate either of the remaining pair of ratchet-wheels, substantially as described.

KARL WENZEL.

Witnesses:
CLARENCE L. BURGER,
C. SEDGWICK.